United States Patent [19]

Phipps

[11] Patent Number: 4,911,215
[45] Date of Patent: Mar. 27, 1990

[54] TREE FELLER-CHIPPER

[76] Inventor: Jeffery S. Phipps, P.O. Box 3048, Tallahassee, Fla. 32315

[21] Appl. No.: 216,206

[22] Filed: Jul. 7, 1988

[51] Int. Cl.$^4$ ............................................. A01G 23/08
[52] U.S. Cl. .................................. 144/337; 144/3 D; 144/34 E; 241/101.7
[58] Field of Search ..................... 241/101.7; 144/2 Z, 144/3 D, 34 R, 34 E, 33 S, 336

[56] References Cited

U.S. PATENT DOCUMENTS

| | | | |
|---|---|---|---|
| 3,533,458 | 10/1970 | McColl | 144/337 |
| 3,661,333 | 5/1972 | Smith . | |
| 3,955,765 | 5/1976 | Gaitten . | |
| 4,062,498 | 12/1977 | Szepaniak | 241/101.7 |
| 4,390,132 | 6/1983 | Hutson et al. . | |

OTHER PUBLICATIONS

Off-Road Chipper Forms Site Prep, Logging Role, G. Griffin, Feb. 1984.
Advertisement of Bruks, Chip Harvesting Unit 1001 CT 4/83.

Primary Examiner—W. Donald Bray
Attorney, Agent, or Firm—Foley & Lardner, Schwartz, Jeffery, Schwaab, Mack, Blumenthal & Evans

[57] ABSTRACT

A method and apparatus are provided for felling and chipping trees, all on a single vehicle, including mounting a grapple and a shear on a connector, mounting the connector to a boom, engaging a tree with the grapple and shear, shearing the tree, moving the tree to a table, moving the vehicle forward to feed the tree on the table into a chipper, feeding the chips from the chipper, into a bin, and empty the bin by tilting same.

24 Claims, 4 Drawing Sheets

TREE FELLER-CHIPPER

BACKGROUND OF THE INVENTION

1. Field of the Invention

The invention relates to the harvesting of trees and the immediate conversion of felled trees into wood chips, and more particularly to a new and novel mobile device for felling, chipping, storing, hauling, and transferring wood fiber.

2. Related Art

Chips of wood are valuable as a fuel, as a raw material for paper mills, and as a mulch for gardening operations. Brush and trees, which are too small to be used as lumber or are not suited for pulp products, are often removed and disposed of at great expense because they hinder the planting of seedling pine trees by standing in the way of land development or because they are stealing nutrients from another more desired species of trees.

One conventional process used to remove trees from a site is by using standard logging skidders and feller bunchers in conjunction with a centrally located whole tree chipper which injects finished chips into accompanying tractor trailer vans. This conventional method has many disadvantages when compared to the feller-chipper of the instant application. These are as follows:

1. In a conventional harvesting operation, each individual tree is handled by equipment at least three times costing time, fuel, and wear; whereas, with a feller-chipper trees are only handled once.

2. Because the feller-chipper operation requires less manpower than the conventional operation, there are fewer labor problems.

3. The feller-chipper operation has a lower overhead, capital cost, and scale thereby allowing improved efficiency due to the owner-operators incentive being able to more completely influence operation.

4. The skidding phase of a conventional operation introduces dirt into the chipper which quickly dulls the chipper blades, while the skidding phase is completely eliminated with the feller-chipper operation.

5. Operator comfort and productivity is enhanced with the feller-chipper as the operator's cab is situated behind everything he is concerned with during operation, and the feller-chipper will not be moving quickly through the woods as in the case of a skidder.

6. The feller-chipper operation does less damage to the ground cover than does the conventional operation; this helps to prevent damaging soil erosion. Also, the preserved ground cover enhances vehicle flotation.

7. The feller-chipper allows for more fiber recovery and land clearing savings on smaller tracts of land than does conventional whole tree chipping due to lower transport costs and lower downtime overhead costs.

8. The conventional operation by nature consists of duplicated equipment and services which make it inefficient in comparison to the feller-chipper operation which accomplishes several tasks with the same piece of equipment.

9. By turning the wood fiber into chip form early in the harvesting process, wood handling costs decrease due to the efficiency inherent in handling wood chips.

Another conventional method used to remove unwanted trees has been to physically uproot them with construction equipment and haul them off site or burn them on site. By this method, no fiber value is recovered, and therefore the site preparation is a pure expense to the developer or to the landowner. The feller-chipper operation offers more positive economics.

Examples of tree chippers are found in U.S. Pat. Nos. 3,661,333, 3,955,765 and 4,390,132. Each of these patents show prior types of feeding and chipping apparatus, with U.S. Pat. No. 3,955,765 illustrating the typical hydraulic means of feeding the whole tree into the chipper. In each instance, the tree feller is a separate and distinct mobile unit from the mobile chipper.

SUMMARY OF THE INVENTION

It is prime object of the instant invention to provide a combined feller-chipper-storer.

Another object is to provide a wood chipping apparatus which can retrieve trees from an off-road environment, including felling standing trees and retrieving trees and tree tops already lying on the ground; convert the trees into chips at the location where the trees are found in the woods; transport and transfer the chips to an on-road container.

A further object is to have a mobile wood chipper capable of performing off the road, as well as being able to store a limited volume of chips. This is all done together with the same apparatus which does the felling and grabbing and being mounted forward of the operator.

A method and apparatus are provided for felling and chipping trees, all on a single vehicle, including mounting a grapple and a shear on a connector, mounting the connector to a boom, engaging a tree with the grapple and shear, shearing the tree, moving the tree to a table, moving the vehicle forward to feed the tree on the table into a chipper, feeding the chips from the chipper, into a bin, and empty the bin by tilting same.

BRIEF DESCRIPTION OF THE DRAWINGS

The above and other objects of the invention will be seen and better appreciated from the following description when taken with the accompanying drawings, wherein.

DETAILED DESCRIPTION OF THE PREFERRED EMBODIMENTS

Figure 1:
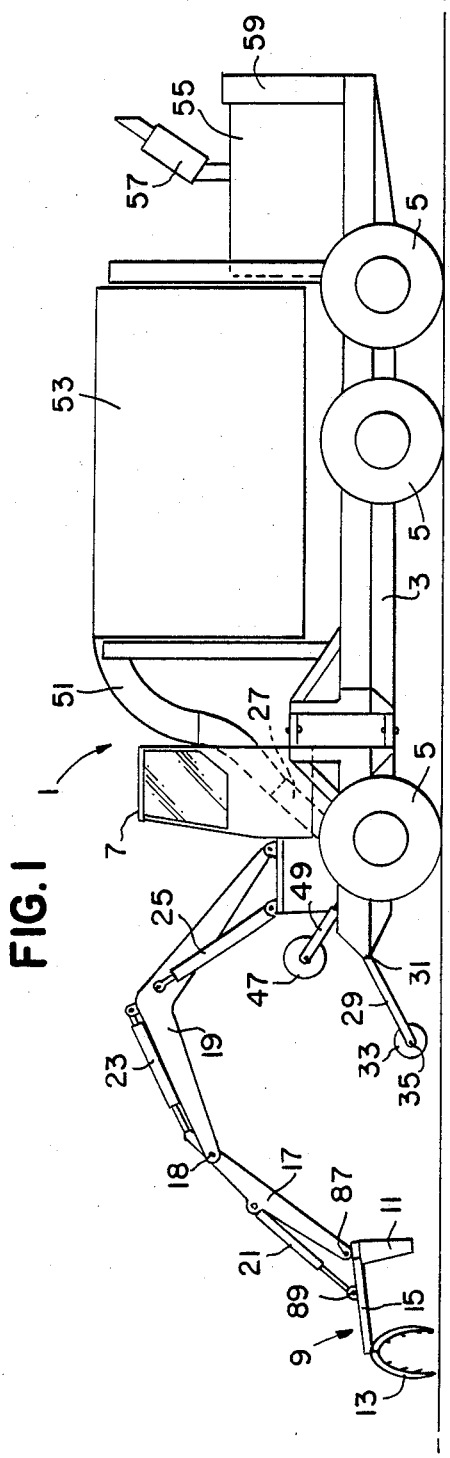
FIG. 1 is a side elevation view of the feller-chipper according to the instant invention.

A mobile feller-chipper according to the instant invention is seen generally as 1 in FIG. 1. It includes a chassis 3 and wheels 5. Mounted on the chassis is an operator's cab 7 rearward and above a feed table discussed below. A combined shear and grapple is seen generally at 9 and includes a shear 11 and a grapple 13 which will be discussed in greater detail below. The shear and grapple are mounted on a connector 15 which in turn is mounted on a boom extension 17 pivoted at 18 to an angled boom 19. Hydraulic means 21, 23 and 25 operate the connector and boom elements 15–19, respectively, in a conventional manner.

Figure 6:
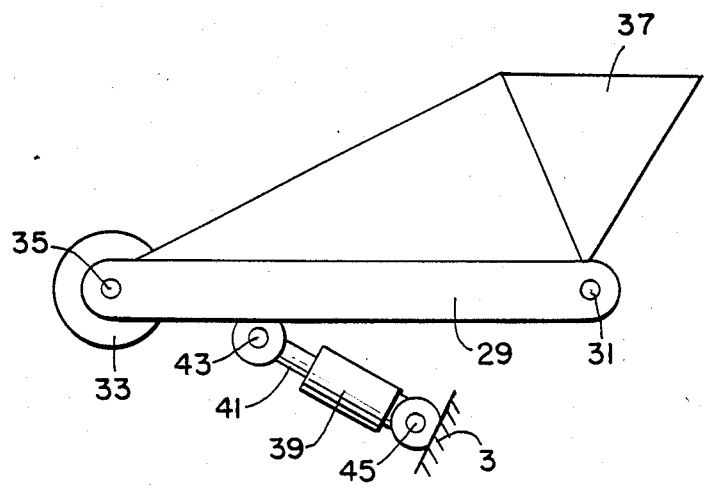
FIG. 6 is a detail seen inside elevation of the feed table.
Figure 7:
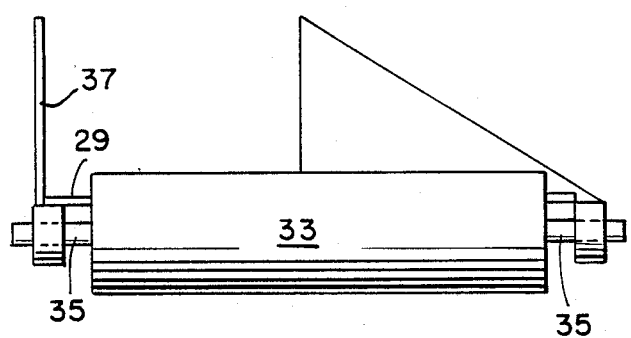
FIG. 7 is a front elevation view of the feed table seen in FIG. 6.

A conventional chipper 27 is situated in the front portion of the unit. Mounted on the front of the vehicle 1 is a feed table 29 which is pivotally mounted to the vehicle at 31 and has a roller 33 rotatably mounted on an axle 35. It is seen in FIGS. 6 and 7, a metal plate 37 is used to assist in directing the tree into the chipper. The feed table 29 is pivoted by means of a hydraulic cylinder 39 having a piston 41 connected to the feed table at a pivot point 43 and to the frame 3 at a pivot 45. It will be appreciated that the detailed view in FIG. 6 is not to scale and shows the feed table relative to the frame at an entirely different angle.

Positioned above the feed table is a feed roller 47 (FIG. 1) which is mounted on an arm 49 pivotally mounted to the frame 3 all in a conventional manner.

Connected to the chipper 27 is a duct 51 which conveys the chips from the chipper 27 into a bin 53 mounted on the vehicle. As seen in the side view of FIG. 1, a conventional engine is located at 55 with an exhaust 57 and a radiator 59.

Figure 4:
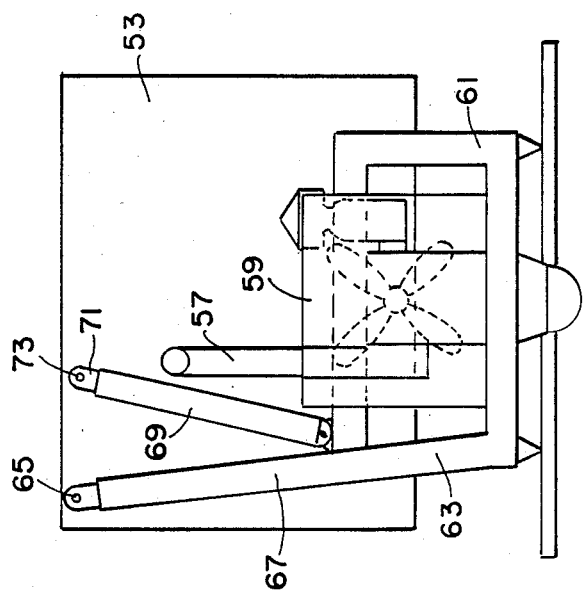
FIG. 4 is a rear elevation view of the unit seen in FIG. 1.
Figure 3:
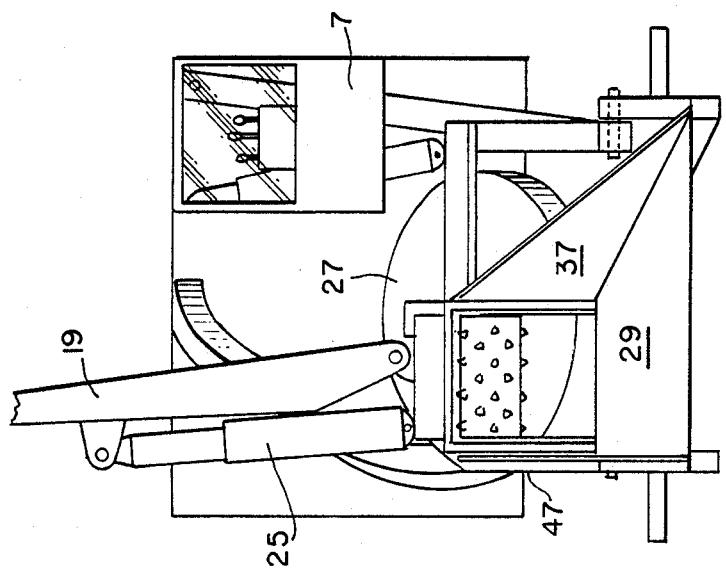
FIG. 3 is an enlarged front elevation view of a portion of the unit seen in FIG. 2.

Referring to FIGS. 1 and 4, the bin 53 can be tilted or dumped by means of a frame 61 which includes an angled member 63 which is pivotally connected at 65 to the bin 53. Also mounted on frame 61 at a point 67 is a hydraulic cylinder 69 having a piston 71 pivotally connected to the bin 53 at a point 73. It will be appreciated that by extension of the piston 71 within cylinder 69 will cause the bin 53 to pivot around point 65 which will permit dumping of the chips accumulated in the bin.

Figure 5:
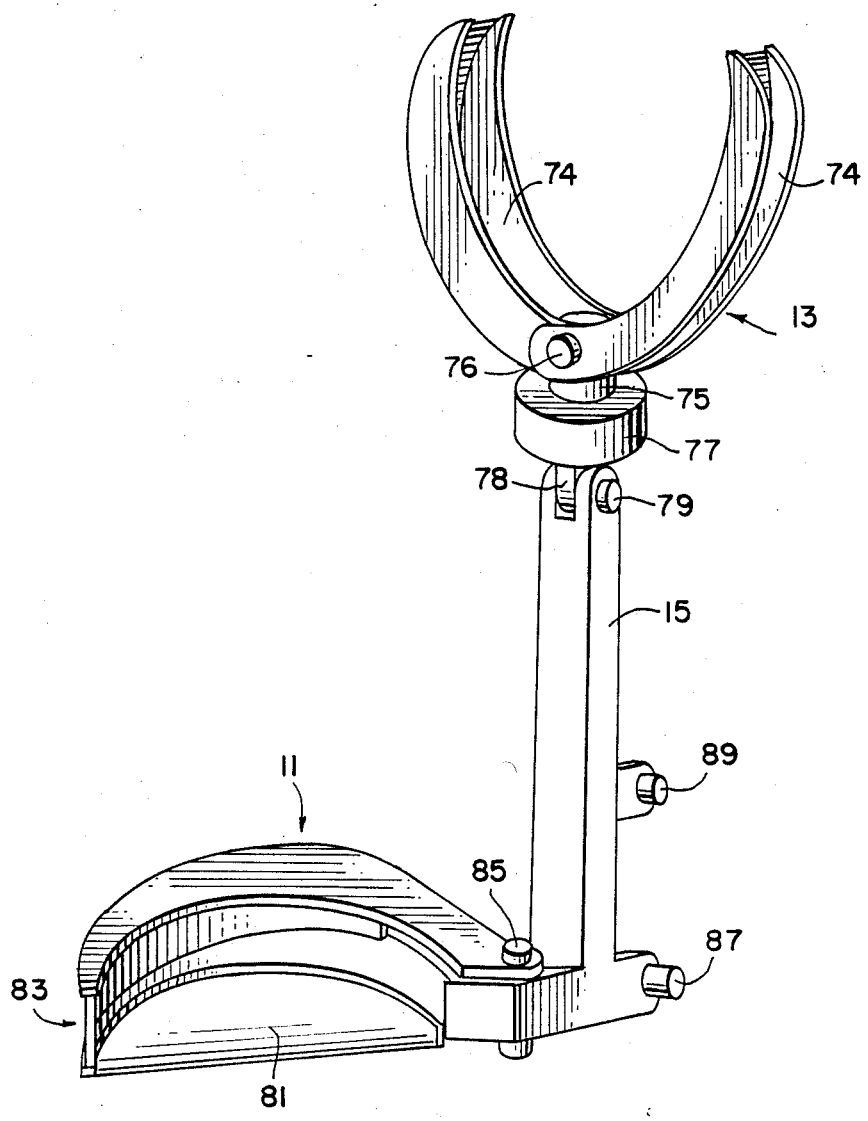
FIG. 5 is a perspective view of the combined shear and grapple.

Referring particularly to FIG. 5, it will be seen that the grapple 13 consists of a pair of jaws 74 pivotally attached to an articulator shaft 75 by a pin 76. The jaws 74 can be opened and closed by means of a hydraulic cylinder by conventional means. The articulator shaft 75 connects to an articulator 77 in accordance with standard and conventional design. The articulator 77 is rigidly mounted to a grapple articulator bracket 78 which is pivotally attached to connector 15 by means of a pin 79. Bracket 78 can rotate freely about pin 79 or can be controlled by an additional hydraulic cylinder (not shown). While the grapple 13 may be of conventional design, its connection to the shear 11 by means of connector 15, as will be discussed below, is not conventional.

The tree shear 11 has a pair of shear blades 81 (only one of which is shown) mounted on respective shear frames 83. The frames 83 are pivotally connected to connector 15 by means of a pin 85 and are actuated by a pair of hydraulic cylinders (not shown). The shear may also include a shroud extending above the frame 83. As will be appreciated from the discussion of the operation below, a pin 87 pivotally attaches the connector 15 to boom 17. The connector is attached to the piston of hydraulic cylinder 21 at a pin 89.

OPERATION

The mobile unit 1 is moved adjacent a standing tree to be felled. The shear-grapple is in a position as generally seen in FIG. 5, except that the grapple 13 will be rotated 90° about pin 79 by means of gravity to be essentially parallel with the shear 11. The grapple jaws 74 and shears 81 will surround the tree. The grapple can either engage the tree prior to shearing, thereafter or generally simultaneously. The shear members 81 will close and sever the tree as close to the ground as practical. Once the tree is sheared, the grapple which engages the tree will be moved by means of booms 17, 19 and hydraulic members 21-25 in order for the tree to be placed on the table 29. It will be noted that the loader range is in front and to both sides of the mobile unit.

Figure 2:
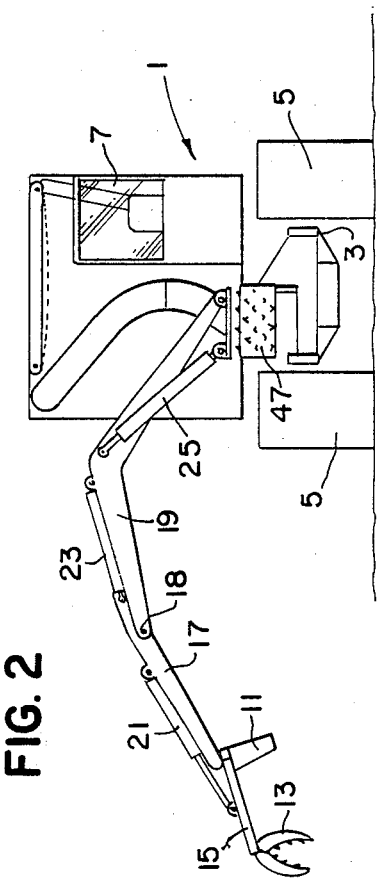
FIG. 2 is a front elevation view thereof.

The tree is obviously held by the grapple before the shears completely close and sever the tree. The frame 83 and/or the shroud (not shown) retain the severed tree parallel to the connector 15. Thus, by holding the tree at two points, the tree cannot rotate. The tree will then be rotated from a position, for example, seen in FIG. 2 where the boom members are off to the side to a point along the axis of the chipper feed chute and table 29. The boom and connector 15 are then rotated to a position generally as seen in FIG. 1 wherein the tree is generally horizontal in order that the end may be placed on the table 29 and roller 33 so that it can then be engaged by the toothed feed roller 47.

The forward motion of the mobile vehicle can, in effect, move the feed table under the bole of the tree. Since the machine is moving, it will continually feed the tree into the chipper, i.e. while still moving forward and with the booms continually rotating to compensate for the forward movement of the vehicle. Alternatively, the grapple can be released from the tree, and the grapple and shear can move to another angle. Since the tree branches and upper portion of the tree are on the ground, the movement of the vehicle forward will force the tree into the chipper at a progressive rate. This makes it possible for the shear and grapple to move to another tree and begin the shearing process on a new tree while the chipping operation on the previously felled tree is completed.

It will be appreciated that by positioning the feed chute and chipper at the front of the vehicle, as opposed to being at the side in other prior art, it is possible for the vehicle to do the loading of the tree progressively into the chipper as discussed immediately above while the shear-grapple can be operating on another tree. Obviously, the efficiency of the felling and chipping operations in a large stand of trees is greatly increased.

Specifically, in operation, after the tree is oriented in a vertical direction generally along the axis of the feed table, the connector is rotated from a vertical to a generally horizontal position. Before the top of the tree hits the ground, the shear or shroud will be opened in such a way as to permit the base of the tree to swing free from its orientation parallel to the connector, it being understood that the conventional grapple is freely pivotable at 79. Once the tree is located generally over the table and roller 33, the grapple can be opened and the tree will rest on the table 29 and roller 33. At this point, the vehicle can move forward to cause the feeding action.

Another advantage of the having the grapple and shear attached to the connector and on the same unit is that if a bulge or crook or some other aspect of the tree causes the tree to get hung up or be too large or of a shape to prohibit it from being accepted into the chipper, it is possible to pivot the connector in such a way so that the shear can sever that portion of the tree which is unable to be accepted into the chipper. For example, if the tree is hung up in the chipper because of its shape, the grapple can pull the tree out from the chipper, the shear can then sever off the offending portion, and then the grapple can continue to insert the tree into the chipper.

It will be appreciated that the chips coming out of chipper 27 are passing through duct 51 into the bin 53. At such time as the bin 53 is full, the vehicle will then proceed to the appropriate place for dumping the chips.

As seen in FIG. 4, the bin is tipped by actuating cylinder 69 which will extend piston 71, rotating the bin 53 around pivot point 65. Once the chips are unloaded, the cylinder 69 is retracted, and the bin returns to the position seen in FIG. 4.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of clearing land of woody material, comprising:
   providing a single vehicle having a clearing means and chipper thereon;
   moving the vehicle to a piece of woody material to be cleared;
   if the piece of woody material is a standing tree, then engaging the tree with a combined shear and grapple and severing the tree at a location on its trunk;
   but if the piece of woody material is fallen, then engaging the piece of woody material with a combined shear and grapple;
   moving the engaged piece of woody material to a chipper on the vehicle;
   inserting the piece of woody material into the chipper;
   chipping the piece of woody material; and
   rotating the severed tree to a substantially horizontal position for insertion into the chipper.

2. The method of claim 1, including feeding chips from the chipped piece of woody material into a bin also on the vehicle, and dumping the bin.

3. The method of claim 1 including positioning a grapple and a shear on a connector and engaging the piece of woody material by the shear and grapple substantially simultaneously.

4. The method of claim 3 including holding the piece of woody material by the shear and grapple at two points and maintaining the piece of woody material substantially parallel to the connector.

5. The method of claim 3 including mounting the grapple and shear by means of a boom attached to the vehicle, and rotating the grapple and shear on the boom approximately 90° to each side of the vehicle.

6. The method of claim 1 including placing an end of the engaged piece of woody material on a table, feeding the end into the chipper positioned at an end of the table.

7. The method of claim 6 including moving the vehicle in a generally forward direction to perform the feeding step.

8. The method according to claim 7, wherein another piece of woody material is engaged while the chipping step is performed.

9. An apparatus for clearing land of woody material, comprising:
   (a) a vehicle;
   (b) a chipper on said vehicle;
   (c) a shear and grapple assembly also mounted on said vehicle, said shear and grapple assembly being movable from a substantially vertical position to engage and sever a standing tree through a substantially horizontal position to engage a fallen piece of woody material;
   (d) means for moving said shear and grapple assembly from a position remote from said chipper to a position adjacent thereto; and
   (e) a table adjacent said chipper.

10. The apparatus according to claim 9, further comprising a cab on said vehicle, said cab being positioned above said chipper and behind said table and said grapple and shear.

11. The apparatus according to claim 9, further comprising means for pivoting said table.

12. The apparatus according to claim 11, further comprising a roller cooperating with said table.

13. An apparatus for clearing land of woody material, comprising:
   (a) a vehicle;
   (b) a chipper on said vehicle;
   (c) a shear and grapple assembly also mounted on said vehicle, said shear and grapple assembly being movable from a substantially vertical position to engage and sever a standing tree through a substantially horizontal position to engage a fallen piece of woody material; and
   (d) means for moving said shear and grapple assembly from a position remote from said chipper to a position adjacent thereto;
   wherein said grapple is rotatably and pivotally positioned on a connector.

14. The apparatus according to claim 13, further comprising a bin adjacent said chipper and means for rotating said bin to empty same.

15. The apparatus according to claim 13 wherein said grapple is mechanically rotated and pivoted by gravity.

16. The apparatus according to claim 13 wherein said shear is also mounted on said connector, and means for opening and closing said shear and said grapple.

17. The apparatus according to claim 13, further comprising a connector for joining said shear and grapple.

18. The apparatus according to claim 17, further comprising a boom joining said connector to said vehicle and wherein said moving means comprises said boom.

19. An apparatus for clearing land of woody material, comprising:
   (a) a vehicle;
   (b) a chipper on said vehicle;
   (c) a shear and grapple assembly also mounted on said vehicle, said shear and grapple assembly being movable from a substantially vertical position to engage and sever a standing tree through a substantially horizontal position to engage a fallen piece of woody material; and
   (d) means for moving said shear and grapple assembly from a position remote from said chipper to a position adjacent thereto; and
   wherein said shear and said grapple are mounted on a rigid connector, said connector is mounted on a boom, and said boom is mounted on said vehicle, and further comprising means for moving said boom to each side of said vehicle to engage a piece of woody material and pivot the piece of woody material around horizontal, vertical and angular axes.

20. An apparatus for clearing land of woody material, comprising:

(a) a vehicle;

(b) a chipper on said vehicle;

(c) a shear and grapple assembly also mounted on said vehicle, said shear and grapple assembly being movable from a substantially vertical position to engage and sever a standing tree through a substantially horizontal position to engage a fallen piece of woody material; and (d) means for moving said shear and grapple assembly from a position remote from said chipper to a position adjacent thereto;

wherein said piece of woody material is loaded into said chipper by moving said vehicle in a generally forward direction.

21. The apparatus according to claim 20, wherein said chipper is located on a forward portion of said vehicle.

22. A method of clearing land of woody material, comprising:

providing a single vehicle having a clearing means and chipper thereon;

moving the vehicle to a piece of woody material to be cleared;

if the piece of woody material is a standing tree, then engaging the tree with a combined shear and grapple and severing the tree at a location on its trunk;

but if the piece of woody material is fallen, then engaging the piece of woody material with a combined shear and grapple;

moving the engaged piece of woody material to a chipper on the vehicle;

inserting the piece of woody material into the chipper; and chipping the piece of woody material;

wherein said fallen piece of woody material is engaged by rotating said combined shear and grapple from a substantially vertical position through a substantially horizontal position.

23. A method of clearing land of woody material, comprising:

providing a single vehicle having a clearing means and chipper thereon;

moving the vehicle to a piece of woody material to be cleared;

if the piece of woody material is a standing tree, then engaging the tree with a combined shear and grapple and severing the tree at a location on its trunk;

but if the piece of woody material is fallen, then engaging the piece of woody material with a combined shear and grapple;

moving the engaged piece of woody material to a chipper on the vehicle;

inserting the piece of woody material into the chipper;

chipping the piece of woody material; and moving the vehicle while the piece of woody material is being chipped.

24. A method of clearing land of woody material, comprising:

providing a single vehicle having a clearing means and chipper thereon;

moving the vehicle to a piece of woody material to be cleared;

if the piece of woody material is a standing tree, then engaging the tree with a combined shear and grapple and severing the tree at a location on its trunk;

but if the piece of woody material is fallen, then engaging the piece of woody material with a combined shear and grapple;

moving the engaged piece of woody material to a chipper on the vehicle;

inserting the piece of woody material into the chipper;

chipping the piece of woody material; and trimming the piece of woody material to sufficient size for insertion into the chipper.

* * * * *